Patented Feb. 26, 1924.

1,484,781

UNITED STATES PATENT OFFICE.

GEORGE W. HEISE, OF ELMHURST, NEW YORK, AND CLARENCE W. BROKATE, OF DANBURY, OHIO, ASSIGNORS TO UNION CARBIDE & CARBON RESEARCH LABORATORIES, INC., A CORPORATION OF NEW YORK.

PRIMARY ELECTRIC CELL AND PROCESS OF PREPARING DEPOLARIZER THEREFOR.

No Drawing. Application filed December 14, 1921. Serial No. 522,387.

*To all whom it may concern:*

Be it known that we, GEORGE W. HEISE and CLARENCE W. BROKATE, citizens of the United States, residing at Elmhurst and Danbury, respectively, in the counties of Queens and Ottawa and States of New York and Ohio, have invented certain new and useful Improvements in Primary Electric Cells and Processes of Preparing Depolarizer Therefor, of which the following is a specification.

This invention relates to processes and means for improving the service characteristics of primary cells having an alkaline electrolyte and a copper oxid depolarizing electrode. The invention comprises broadly the association of nitrogenous materials, preferably ammonia or ammonium compounds, with the electrolyte or depolarizer of such cells.

It is known from the disclosure of United States Patent 1,282,057, granted to R. W. Erwin on October 22, 1918, that the addition of sulfur to copper oxid depolarizer results in a material increase in the voltage and service life of cells of the zinc-alkali-copper oxid type. We have devised certain procedures which may be used to improve the functioning of cells containing sulfured copper oxid depolarizers, while retaining the physical and chemical properties of the sulfured oxid which result in the increased voltage. For brevity, the term "high voltage depolarizer" will be used herein to designate depolarizers containing copper oxid associated or combined with sulfur or sulfur compounds.

In one embodiment of the invention, the service characteristics of cells provided with high voltage depolarizer are improved by the addition of ammonia or ammonium salts to the caustic alkali electrolyte. It has heretofore been demonstrated that in cells having a zinc electrode immersed in sodium hydroxid solution, the internal resistance of the cell may be diminished by the presence of ammonia, probably because of its solvent action upon deposits of sodium zincate or other compounds formed upon the zinc. We have found that, in addition to this advantage, ammonia exerts a restorative effect upon the voltage of cells provided with sulfured depolarizers.

Cells which show a premature decrease in voltage may be brought substantially to normal voltage by application of ammonia in the form of a salt, as ammonium hydroxid, or as gaseous ammonia. For example, ammonium sulfate may be dissolved in the cell electrolyte. A satisfactory procedure is to add about 50 grams of the sulfate to a 500 ampere-hour cell, that is, a cell containing about 4 liters of electrolyte and a kilogram of copper oxid. Improved service results, however, from the use of widely varying quantities of the salt. Ammonium hydroxid or ammonia, in amounts equivalent to the ammonia content of the sulfate, may be used.

Other nitrogenous substances, such as urea, gelatine, and even wheat flour, may be substituted for ammonia. For restoring the voltage of a 500 ampere-hour cell, in most cases from 25 to 75 grams of any of these substances may be added to the electrolyte.

Ammonia and ammonium salts may also be used with advantage as an initial constituent of the depolarizer, as they tend to stabilize the voltage of the cell. We have found, for example, that copper oxid which has been subjected to an ammonia wash, or which has been produced by an ammonia extraction process and carries residual ammonia, may be made up into an improved high voltage depolarizer, provided the sulfuring process is not conducted in such manner as to remove the ammonia or ammonia compounds retained by the oxid.

To avoid the loss of ammonia, we adopt a low temperature sulfuring operation such as the following: Copper oxid containing ammonia is treated at room temperature with a solution of a sulfid. Preferably aqueous solutions of sodium, ammonium, or hydrogen sulfids or polysulfids are used. The concentration and composition of the solutions may be considerably varied. Satisfactory results are obtained by using sodium polysulfid in water solution containing about 10% of the salt. The amount of the sulfid should be such that the final sulfur concentration in the depolarizer is about 1–2%. The reaction between copper oxid and sodium polysulfid is practically quantitative and the amount of the salt required to sulfur any given weight of oxid may therefore be calculated readily.

Under the conditions stated, the sulfur contained in the solution combines with the copper oxid to form more or less definite compounds containing copper, oxygen, and sulfur. It has heretofore been proposed to sulfur copper oxid, containing no ammonia, with soluble sulfids. We have found that the sulfured oxid prepared as herein described is a high voltage material having service characteristics superior to those of non-ammoniated oxid to which sulfur has been added in a similar manner.

If the ammonia-content of the oxid is low, the sulfuring should be carried out with ammonium sulfid or polysulfid, as in this way an additional amount of ammonia will be incorporated with the oxid. The ammonia wash, previously referred to, may be carried out by subjecting copper oxid to the action of a 10% aqueous solution of ammonia for about 5 minutes. The oxid may then be removed by filtration and dried. This process is merely illustrative and any other desired method of adding a small amount of ammonia may of course be adopted.

Copper oxid containing no ammoniacal substance and sulfured in the above described or any suitable way, may be improved by incorporation with an ammonia-containing body. This may be an ammonium salt, copper oxid carrying ammonia, ammonium hydroxid, etc. For example, we have found that by intimately mixing copper oxid prepared by the ammonia process, and retaining some ammoniacal substances, with sulfured oxid, a highly efficient depolarizer is obtained. Preferably a small proportion, about 10 to 15%, of ammoniated oxid is milled with the sulfured material. An ammonium salt, the sulfate for example, may be added to the high voltage oxid, with excellent effect. Sulfids of copper or other high voltage material may be used instead of sulfured oxid. Nitrogenous materials, such as urea, gelatine, or wheat flour, may be incorporated with the depolarizer.

Products prepared according to the foregoing processes are effective as depolarizers, and cells in which they are used show a high and substantially constant voltage independent of variations in service requirements.

We claim:—

1. A process of making galvanic cells, which comprises disposing in operative relation to a sulfured copper oxid depolarizer a nitrogenous material capable of improving the service characteristics of the cell.

2. A process of making galvanic cells, which comprises disposing in operative relation to a sulfured copper oxid depolarizer an ammoniacal substance capable of improving the service characteristics of the cell.

3. A process of preparing a depolarizer, which comprises sulfuring copper oxid containing an ammoniacal substance, under conditions adapted to retain said substance therein.

4. A process of preparing a depolarizer, which comprises reacting upon copper oxid containing an ammoniacal substance with a soluble sulfid at low temperature.

5. A process of preparing a depolarizer, which comprises reacting upon copper oxid containing ammonia with an aqueous solution of a sulfid.

6. A process of preparing a depolarizer, which comprises sulfuring copper oxid and incorporating an ammonia-containing substance therewith.

7. A process of preparing a depolarizer, which comprises reacting upon copper oxid with a soluble sulfid, and intimately mixing with the resulting product copper oxid containing an ammoniacal substance.

8. A process of preparing a depolarizer, which comprises reacting upon copper oxid with a soluble sulfid, and incorporating an ammonium salt with said oxid.

9. Sulfured copper oxid depolarizer comprising a nitrogenous substance.

10. Copper oxid depolarizer containing sulfur and an ammoniacal substance.

11. Sulfured copper oxid depolarizer containing an ammonium salt.

12. A cell of the zinc-alkali-copper oxid type, in which the copper oxid is associated with sulfur, and a nitrogenous substance having the property of improving the service characteristics of the cell is operatively disposed therein.

In testimony whereof, we affix our signatures.

GEORGE W. HEISE.
CLARENCE W. BROKATE.